United States Patent
Stiehl et al.

[11] Patent Number: 5,364,600
[45] Date of Patent: Nov. 15, 1994

[54] APPARATUS FOR PRODUCING OZONE FROM OXYGEN

[75] Inventors: Hans-H. Stiehl; Jürgen Schweckendiek, both of Berlin, Germany

[73] Assignee: Sorbios GmbH, Germany

[21] Appl. No.: 785,542

[22] Filed: Oct. 31, 1991

[30] Foreign Application Priority Data

Nov. 2, 1990 [DE] Germany .................. 4035272

[51] Int. Cl.⁵ ............................................. B01J 19/12
[52] U.S. Cl. .......................... 422/186.07; 422/186.18
[58] Field of Search ................... 422/186.07, 186.18

[56] References Cited

U.S. PATENT DOCUMENTS

| | | | |
|---|---|---|---|
| 3,214,364 | 10/1965 | Tuyle et al. | 422/186.07 |
| 4,666,679 | 5/1987 | Masuda et al. | 422/186.2 |
| 4,834,948 | 5/1989 | Schmiga et al. | 422/186.19 |
| 4,892,713 | 1/1990 | Newman | 422/186.07 |
| 4,960,570 | 10/1990 | Mechtersheimer | 422/186.21 |
| 5,009,858 | 4/1991 | Mechtersheimer | 422/186.19 |
| 5,102,629 | 4/1992 | Hayashi et al. | 422/186.18 |
| 5,154,895 | 10/1992 | Moon | 422/186.07 |

FOREIGN PATENT DOCUMENTS

| | | |
|---|---|---|
| 6102569 | 9/1982 | European Pat. Off. . |
| 1943629 | 1/1972 | Germany . |
| 3517078 | 11/1986 | Germany . |
| 3731168 | 3/1989 | Germany . |

Primary Examiner—Donald P. Walsh
Assistant Examiner—Daniel Jenkins
Attorney, Agent, or Firm—Basile and Hanlon

[57] ABSTRACT

An apparatus for producing ozone from oxygen includes at least one discharge electrode and counterelectrode which are separated by a dielectric of high heat conductivity and tightly bear on the dielectric that is cooled in a direct manner. The discharge electrode, around which oxygen flows, forms a non-closed surface and is in the form of a wire. By applying an electric field, the discharge electrode triggers a discharge in the gas space surrounding the discharge electrode and on the dielectric. The discharge electrode is made of molybdenum, tungsten, niobium or tantalum and is directly exposed to the oxygen flow.

4 Claims, 1 Drawing Sheet

APPARATUS FOR PRODUCING OZONE FROM OXYGEN

BACKGROUND OF THE INVENTION

1. Field of the Invention

The invention relates to apparatus for producing ozone from oxygen.

2. Description of the Art

From German Laying-Open Specification 37 31 168, an apparatus for producing ozone from oxygen has become known which has two electrodes separated by a dielectric in the form of a tube and having a high conductivity. The discharge electrode, therewith, is constructed as a discrete structural element and tightly bears on the circumference of the dielectric. The discharge electrode, around which the oxygen flows, forms a non-closed surface and is in the form of a wire. By applying an electric field, a discharge is triggered in the gas space surrounding the discharge electrode and on the dielectric which is made of a ceramic material. By means of this apparatus, with which ozone is produced in accordance with the principle of silent electric discharge, high production densities per unit of area are attained with a discharge of medium frequency as compared to other arrangements. Since an "open" electrode in the form of a wire is used, direct cooling is possible. The electrode wire is made of high-grade steel, nickel or copper. It is true that the production of ozone by means of the known apparatus enables high production densities per unit of an area to be achieved with an operation of medium frequency, but energy yield and the attainable production density per unit of area, with high concentrations, are limited and, in part, inferior to comparable results of ozone-producing apparatus of a conventional kind in which the arrangement is made up of the combination of electrode-dielectric-air gap-dielectric.

To the technical use of an ozone-producing apparatus, energy yield is of great importance. In addition, more recent applications of ozone necessitate particularly high ozone concentrations. The semiconductor industry shall serve as a relevant example. There, ozone is increasingly used for cleansing processes and as a process gas and, therefore, the availability of high ozone concentrations not only leads to an acceleration of the cleansing processes; but, also, to qualitative improvements, e.g., of precipitated $SiO_2$-coatings.

It, therefore, is the object of the present invention to provide an apparatus for producing ozone from oxygen in which energy yield and production density per unit of area, with high concentrations, are improved.

SUMMARY OF THE INVENTION

The use of tungsten, molybdenum, niobium or tantalum for the discharge electrode in the form of a wire surprisingly resulted in a possible increase in the yield by 20 to 50 percent as compared to prior art apparatus in which high-grade steel is used for the discharge electrode.

In addition thereto, limiting concentrations of over 400 grams of ozone per cubic meter may be achieved with electrodes made of tungsten.

The increase in the attainable ozone concentrations, moreover, also offers advantages in traditional applications since the reaction rates and the dissolution rates are thereby increased.

In the case of ozone applications in the semiconductor industry, great demands are made upon the purity of the process gas. Contaminations resulting from the discharge process must be avoided. This is why electrode materials which are composed of but one chemical element are of advantage.

It is true that, in German Laying-Open Specification 37 31 168, materials other than high-grade steel, namely, nickel and copper, are employed. However, there is no indication that the efficiency of the discharge process is affected by the nature of the used materials so that there is reason for the conclusion that, analogously to conventional ozone-producing apparatus, it was seen that the material possesses sufficient stability. When air was used as the application gas, catalyzers were suggested in order to augment efficiency of ozone production (German Published Specification 19 43 629); efficiency of the apparatus, however, was not improved in oxygen. In German Laying-Open Specification 35 17 078, the proposal is made to coat the metallic electrode on its operational side with a chrome layer or to make it directly from chrome, reference being made to an improvement of the efficiency in the operating range. Tests with layers rich in chrome in an arrangement according to German Laying-Open Specification 37 31 168 did not lead to an increase in the yield. Similar results were also obtained in the case of palladium and nickel-nickel layers in other tests.

In European Laying-Open Specification 0 102 569, an apparatus for producing ozone is described along with a method of making the same which includes the step of shaping an unburned ceramic mass into a plate, to the surface of which a paste containing tungsten powder is applied in lines by means of a screen printing technique. The lines form part of the discharge electrodes. Then the arrangement, as a whole, is shaped into a hollow cylinder which will be sintered and baked. In order to avoid oxidation, the electrodes containing the tungsten powder are subsequently coated with nickel. It is true that with this known subject matter, use is made of tungsten powder when it comes to the special method of making the electrodes by applying them with the help of a screen printing technique, in which case sintering will subsequently take place and the arrangement, as a whole, will be baked; but, at the same time, attention is drawn to the fact that, in order to prevent oxidation, a coating of nickel must be provided. In view of the foregoing, the use of tungsten for achieving an improvement of the efficiency of ozone-producing apparatus, therefore, is not suggested to the expert; rather, he is told that such a use would not make any sense since oxidation will occur.

DESCRIPTION OF THE PREFERRED EMBODIMENT

Figure 1:
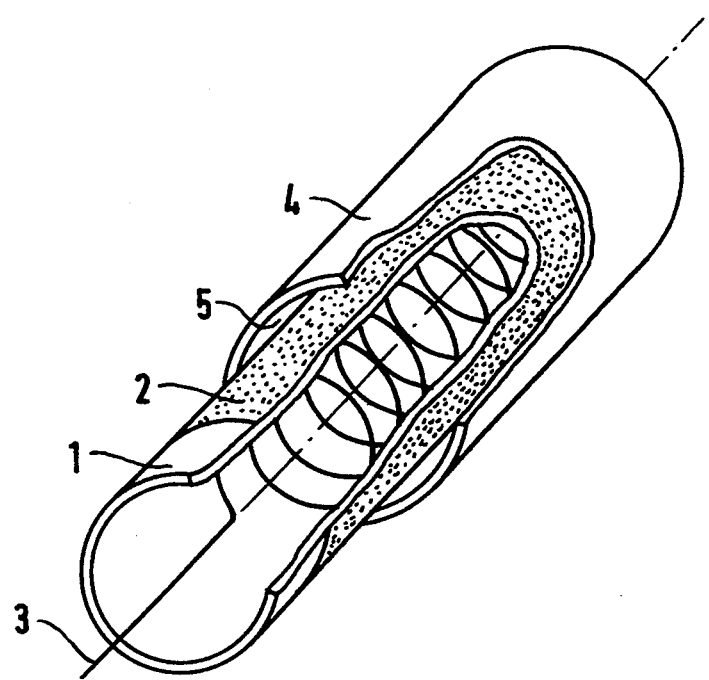
FIG. 1 is a perspective view of an apparatus for producing ozone from oxygen according to the teachings of the present invention.

The test results disclosed hereinafter were achieved by means of an arrangement according to German Laying-Open Specification 37 31 168, shown in FIG. 1, and with which a dielectric 1 is used that is designed as an elongated tube made of ceramic materials, in particular, $Al_2O_3$. As a discharge electrode 3, a wire having a diameter of preferably 0.5 mm. is used, which, however, may also be larger, e.g., 1 mm. The wire is in the form of a helix and is inserted under tension in the interior of the tubular dielectric 1. The tubular dielectric 1 is embraced by an outer tube 4, a cooling medium 5, namely water, being directed into the space between a counter-electrode 2 and the outer tube 4 and, at the same time, serving as the counterelectrode. The wire is preferably made of molybdenum or tungsten, but niobium or tantalum may also be used, the application of which, however, yields a result that is somewhat poorer than that achieved by using molybdenum and tungsten.

The parameters which are of importance in the production of ozone are indicated by the following:

Ozone production (p)

Ozone production means that quantity (mass) of ozone which man be produced during a given period by means of the apparatus through which an oxygen-containing gas stream or oxygen flows. It is determined by a measurement of the volumetric rate ($\dot{v}$) of gas flow and the ozone concentration (c).

$$P = c \cdot \dot{v}$$

The apparatus for producing ozone may substantially be characterized by the energy yield (A) and the production density per unit of area (P/F). The production density per unit of area indicates how much ozone per unit of time and elementary area (of dielectric) can be produced, high production densities per unit of area, in general, meaning low investment cost and small-size structural shapes with a given performance.

With a given apparatus for producing ozone, production density per unit of area may generally be influenced by the electric power that is fed into the apparatus. Assuming that:

$$\frac{P}{F} = A \cdot \frac{Nel}{F},$$

the production density per unit of area is equal to the yield (quantity of ozone per expenditure of energy) multiplied by the production density per unit of area.

In case of a given gas through-flow and given cooling, production, i.e., production density per unit of area, increases first and then together with an increase in power density per unit of area. But since increasing electric power also involves an increase in temperature in the given apparatus, back reaction to oxygen is favored. Thus, the production density per unit of area is not augmented together with the power density per unit of area in a linear manner, i.e., the yield is reduced when the power density per unit of area is augmented.

$$A = A\,(P/F)$$

In order to achieve optimization, A (the yield) shall be as high as possible with a high P/F (production density per unit of area). Moreover, back reaction from ozone to oxygen is favored by an increasing ozone concentration. With a given arrangement, the yield will be reduced when the ozone concentration is augmented.

$$A = A\,[(P/F), c]$$

The development of apparatus for producing ozone aims at achieving a high yield A with as high a P/F (production density per unit of area) as possible and with as high a concentration as possible.

The tabular values listed in the following table number 1 were attained under equal conditions.

In comparison therewith, recourse is had to the yield with approximately like production density per unit of area and concentration.

Attainable energy yield with like arrangement, concentration and production density per unit of area is dependent on the electrode material:

TABLE Number 1

| c [g/m3] | P/F $\left[\frac{g}{hm_2}\right]$ | $\frac{1}{A}\left[\frac{wh}{g}\right]$ | Electrode |
| --- | --- | --- | --- |
| 40–50 | 1300–1500 | 9.0 | W |
| 40–50 | 1300–1500 | 10.0 | Mo |
| 40–50 | 1300–1500 | 11.5 | Nb |
| 40–50 | 1300–1500 | 12.0 | Ta |
| 40–50 | 1300–1500 | 16.0 | High-grade steel |
| ~60 | 1800–2000 | 12.0 | W |
| ~60 | 1800–2000 | 12.5 | Mo |
| ~60 | 1800–2000 | 15.0 | Nb |
| ~60 | 1800–2000 | 15.0–16.0 | Ta |
| ~60 | 1800–2000 | cannot be attained with high-grade steel | High-grade steel |
| ~110–120 | 850–950 | 13.9 | W |
| ~110–120 | 850–950 | 16.8 | Mo |
| ~110–120 | 850–950 | 18.5 | Nb |
| ~110–120 | 850–950 | 20.5 | Ta |
| ~110–120 | 850–950 | 30.0 | High-grade steel |

All tested metals show a noticeable increase from high-grade steel. Only 50 to 60 percent of the energy required must be expended when tungsten is employed, as compared to high-grade steel, in order to produce the same quantity of ozone with a like concentration.

With regard to the other tested electrodes, the order of rank is as follows:

$$A\,(W) \approx A\,(Mo) > A\,(Nb) \approx A\,(Ta) >> A\,(\text{high-grade steel})$$

The relation of the reciprocal values of the energy yields to those of tungsten for the series of measurements accrues in the following way:

| c | P/F | $\frac{A(W)}{A(W)}$ | $\frac{A(W)}{A(Mo)}$ | $\frac{A(W)}{A(Nb)}$ | $\frac{A(W)}{A(Ta)}$ | $\frac{A(W)}{A(\text{High-grade steel})}$ |
| --- | --- | --- | --- | --- | --- | --- |
| 40–50 | 1300–1500 | 1 | 1.11 | 1.27 | 1.36 | 1.78 |
| 60 | 1800–2000 | 1 | 1.04 | 1.25 | 1.29 | — |
| 110–120 | 850–950 | 1 | 1.20 | 1.33 | 1.47 | 2.15 |

Accordingly, the use of tungsten electrodes is of particular advantage insofar as importance is attached to ozone production with high concentrations.

By means of an appropriate arrangement which was made up of 10 individual tubes according to FIG. 1, connected in parallel and formed of $Al_2O_3$, the tubes each having an outer diameter of 8 mm., a wall thickness of 1 mm., a length of 1 m. and a coil of tungsten (diameter < 1 mm.), 12 grams of ozone per hour with a concentration of 400 grams per cubic meter were produced from oxygen.

Energy expenditure amounted to about 37 watthours per gram. Of this amount, 6 watthours per gram are avoidable losses of the initial specific electric feed as used so that, at the arrangement, merely 31 watthours per gram were reacted. Accordingly, 54 grams per hour, with 300 grams of ozone per cubic meter, were attained with an energy expenditure of 26 watthours per gram of ozone or approximately 21 watthours per gram of ozone, minus the losses of the initial feed.

With coils of high-grade steel, only ozone concentrations below 300 grams per cubic meter could be achieved.

It was found that there is no simple connection that could be expected from a physical point of view between augmentation of the yield and a physical characteristic quantity, such as, for example, the electron release operation, amounting for tungsten to 4.53 electron volts, for molybdenum to 4.24 electron volts, for niobium to 3.99 electron volts, for tantalum to 4.13 electron volts and for high-grade steel to 4.6 electron volts.

Apart from discharge electrodes of high-grade steel, further materials of which high resistance to oxidation and good suitability for the production of ozone were expected were tested, namely nickel—solid, high-grade steel with an electrolytic Ni-, PdNi-, PdCr- and a further chrome alloy coating. Surprisingly, negative results with regard to concentration and energy yield were achieved therewith, namely, values amounting to only 30 to 50 percent of the values of high-grade steel (under equal test conditions). Moreover, they showed extremely fast aging: Within about 20 hours of operation, the values dropped to 10 percent of the initial values and less. In the case of high-grade steel, aging amounts merely to 10 to 20 percent in 5,000 hours; and, in case of tungsten, from below 5 percent up to a maximum of 5 percent.

Thus, it can be acknowledged that, with special reference to tungsten and molybdenum, but also to niobium and tantalum, a material has unexpectedly been found that solves the set object in an excellent manner.

What is claimed is:

1. In an apparatus for producing ozone from oxygen including at least one discharge electrode and counter-electrode which are separated by a dielectric of high heat conductivity and which tightly bear on the dielectric that is cooled in direct manner, the discharge electrode, around which oxygen flows, forming a non-closed surface and being in the form of a wire, the discharge electrode triggering a discharge in the gas space, surrounding the same, and on the dielectric by applying an electric field thereto when electric power is applied to the discharge electrode, the improvement characterized in that the discharge electrode is made of one of molybdenum, tungsten, niobium and tantalum and is directly exposed to the oxygen flow.

2. The improvement according to claim 1 characterized in that the discharge electrode comprises a metallic conductor which is coated with at least one of molybdenum, tungsten, niobium and tantalum, the thickness of the coating being such that the coating exhibits the metallic properties of the materials.

3. The improvement according to claim 1 characterized in that the dielectric is in the form of a tube and that the discharge electrode helically bears on the tube, the wire diameter of the discharge electrode being between 1 mm. and 0.2 mm.

4. The improvement according to claim 3 characterized in that the wire diameter of the discharge electrode is 0.5 mm.

* * * * *